2,867,649

PROCESS OF PURIFYING PYRETHRIN EXTRACTS

Thomas A. Haney, Stony Brook, N. Y., assignor to Olin Mathieson Chemical Corporation, a corporation of Virginia No Drawing. Application September 6, 1956
Serial No. 608,188

3 Claims. (Cl. 260—468)

This invention relates to the purification of extracts of pyrethrum flowers, particularly of solutions of insecticidal pyrethrins in kerosene or other higher petroleum fractions.

Prior to about 1954 dried pyrethrum flowers were shipped to the United States for the purpose of extraction with various solvents to obtain insecticidally active pyrethrins. There are now available 25 weight percent concentrated solutions of pyrethrins in kerosene or other higher boiling aliphatic liquids, as raw materials for the pyrethrum industry. It is more economical to ship the 25 percent extract, since dried pyrethrum flowers contain a lesser percentage of pyrethrins.

The separation of pure pyrethrins for use in household aerosols from the extracts is not a simple operation. The kerosene-like solvents extract not only pyrethrins from the flowers, but also certain constituents which are insoluble in the Freons (certain proprietary chlorofluoromethanes and ethanes) commonly used as areosol propellants. These Freon-insolubles must be removed to obtain pyrethrin compositions suitable for Freon-type aerosols. The specification for the 11.8 percent pyrethrin in solution in Ultrasene, a proprietary highly refined kerosene, commonly employed in aerosol compositions, states that about 0.5 weight percent of Freon-insolubles is the maximum tolerance. Insolubles in excess of this amount are sufficient to cause clogging of the nozzle of the aerosol release.

It is an object of this invention to provide a novel process for the separation of contaminants from the crude 25 percent by weight solution resulting from the extraction of pyrethrum flowers with kerosene or other similar solvents. A further object is to economically produce pyrethrin solutions of sufficient purity to be suitable for Freon-type aerosols.

This process is based on the discovery that Freon-insoluble contaminants can be removed from the crude extract by precipitating them at temperatures of 0° C. or below in the presence of a saturated aliphatic hydrocarbon having from 5 to 7 carbon atoms, as for example, petroleum ether or hexane.

According to this invention a 20 to 30 weight percent pyrethrum extract is diluted with about 2 to 3 parts by weight of the light hydrocarbon. While this ratio is not absolutely necessary for the operation of this invention, it is the most advantageous. If less than about 2 parts by weight of these hydrocarbons are added, the resulting solution is generally not sufficiently pure for Freon-type aerosol use, but it is suitable for other purposes. Use of more than about 3 to 4 parts of the light hydrocarbon, although operative, is less economical because of increased heat requirements for solvent recovery, greater solvent losses, and the requirement for larger size equipment.

Due to their volatility, the use of hydrocarbons having less than 5 carbon atoms introduces excessive losses by evaporation, and a fire hazard. If the evaporation losses are to be minimized by suitable equipment, the savings on the solvent are offset by the additional cost of such equipment. Hydrocarbons boiling higher than heptane are also disadvantageous. In addition to their poorer extraction efficiency, they boil at temperatures sufficiently high to decompose substantial amounts of pyrethrins when the solvent is removed by evaporation. Vacuum distillation equipment is necessary to recover such solvents during the re-concentration of the pyrethrin extract. A third and more costly drawback of the higher aliphatics is their increased viscosity at low temperatures. Centrifugation or filtration of the purified extract to remove the Freon-insoluble sludge proceeds, for example, over six times as fast with hexane as with Ultrasene. The hexane extract does not require a separation unit of as large capacity as do the higher aliphatic extracts.

After mixing the extract with the light hydrocarbons, the mixture is chilled to 0° C. to −30° C. This temperature is maintained until substantially all of the impurities have precipitated. This usually requires from 10 to 40 hours depending upon concentrations employed. The precipitated sludge is then removed by any suitable method. Contrifugation is entirely satisfactory. At this point it is usually advantageous to decolorize the extract with, for example, active carbon.

After the solution has been decolorized, and the adsorbent filtered off, the pyrethrin extract can be concentrated by distilling away the light hydrocarbon solvent. The pyrethrin concentrate obtained in this way is entirely satisfactory for direct use in household aerosols.

The following example illustrates the application of this invention to the purification of a pyrethrum extract.

Example (a) A 500 gram sample of Kenya pyrethrum extract solution which analyzed 25.5 weight percent pyrethrins (by the Methods of Analysis of the Association of Official Agricultural Chemists, 7th edition), thus containing 127.5 grams of pyrethrins, was mixed with 1500 grams of hexane. The mixture was chilled at −20° C. for 24 hours and then centrifuged at 13,000 times the force of gravity at this temperature. The separated sludge was freed from hexane by mild heating and contained 19.5 weight percent or 13.6 grams of pyrethrins. The purified extract contained 114 grams of the pyrethrins originally charged, representing a recovery of 89.3 percent.

The hexane was removed from this extract, by atmospheric distillation, and the concentrate diluted to 20 weight percent pyrethrins with Ultrasene. This product showed a Freon-insoluble content of 0.96 weight percent. Further dilution of this purified extract with Ultrasene to an 11.8 weight percent pyrethrin content yields a mixture suitable for household aerosol use.

(b) The purified extract of part (a) can be decolorized as follows:

The extract of part (a) was diluted with hexane until the total weight of the mixture was again 2000 grams. A 200 gram aliquot was removed and was agitated for seven hours with 4 grams of Darco–S–51 (active carbon) and 2 grams of Celite (a diatomaceous earth filter aid) to effect decolorization. After standing for 24 more hours, at room temperature, the material was filtered through a Buchner funnel. The filter cake weighed 10.0 grams and contained 6.0 weight percent or 0.69 gram of pyrethrins of the 11.4 grams charged to this step. The hexane was removed from the decolorized extract by vacuum distillation, and there remained 41 grams of concentrate with a pyrethrin content of 26.1 percent or 10.7 grams. The recovery of pyrethrins in this decolorization step was 94 percent while the overall recovery from the crude extract was 84 percent.

(c) Additional pyrethrins can be recovered by further treatment of the sludge obtained in part (a).

A 64 gram sample of the primary sludge, which analyzed 19.5 percent pyrethrins, was diluted with 512 grams of Ultrasene and agitated for 3 hours at 65° C. After agitation, the material was aged at —20° C. for 24 hours. The mixture was then centrifuged at this temperature at 13,000 g. In this step there was obtained 68.0 grams of sludge (secondary) and 508.0 grams of extract with a pyrethrin content of 1.22 percent or 6.2 grams.

A 60 gram sample of the secondary sludge was diluted with 240 grams of Ultrasene and the treatment of the preceding paragraph was repeated. A tertiary sludge weighing 76.5 grams was removed from the centrifuge. The extract solution weighed 223.5 grams and analyzed 0.41 percent or 0.92 gram of pyrethrins.

By extraction of the sludge in the above manner an additional 7.1 grams of pyrethrins were obtained. The overall recovery of high purity pyrethrins by this process is then 89.3 percent.

It is claimed.

1. A method for the purification of concentrated extracts of pyrethrum flowers in a petroleum solvent boiling within the kerosene range which comprises admixing such an extract with from two to four times its weight of at least one saturated aliphatic hydrocarbon containing from five to seven carbon atoms, maintaining the mixture at a temperature within the range from 0° C. to —30° C. for a time sufficient to precipitate constituents of the extract insoluble in chlorofluoromethanes and chlorofluoroethanes, separating the precipitate from the remainder of the mixture, and removing said saturated aliphatic hydrocarbon from the mixture.

2. The method of claim 1 wherein said saturated aliphatic hydrocarbon is hexane.

3. The method of claim 1 wherein said saturated aliphatic hydrocarbon is petroleum ether.

References Cited in the file of this patent

UNITED STATES PATENTS

| | | |
|---|---|---|
| 2,050,974 | La Forge et al. | Aug. 11, 1936 |
| 2,372,183 | Barthel et al. | Mar. 27, 1945 |
| 2,467,859 | Sankowsky | Apr. 19, 1949 |